United States Patent
Enander et al.

(10) Patent No.: US 6,732,940 B2
(45) Date of Patent: May 11, 2004

(54) COMPACT VEHICLE HEATING APPARATUS AND METHOD

(75) Inventors: Harold R. Enander, Brighton, CO (US); Thomas A. Acree, Denver, CO (US)

(73) Assignee: Vehicle Systems Incorporated, Fort Lupton, CO (US)

( * ) Notice: Subject to any disclaimer, the term of this patent is extended or adjusted under 35 U.S.C. 154(b) by 0 days.

(21) Appl. No.: 10/453,181

(22) Filed: Jun. 2, 2003

(65) Prior Publication Data

US 2003/0192954 A1 Oct. 16, 2003

Related U.S. Application Data (63) Continuation of application No. 10/027,473, filed on Dec. 21, 2001, now Pat. No. 6,572,026, which is a continuation of application No. 09/454,157, filed on Nov. 30, 1999, now Pat. No. 6,332,580.
(60) Provisional application No. 60/110,474, filed on Nov. 30, 1998.

(51) Int. Cl.[7] .............................................. G05D 23/00
(52) U.S. Cl. ................... 237/2 A; 237/12.3 B; 237/8 A
(58) Field of Search ............................. 237/12.3 B, 2 A, 237/8 A, 12.3 C, 12.3 R, 19; 165/41, 42, 288, 293, 290

(56) References Cited

U.S. PATENT DOCUMENTS

| | | |
|---|---|---|
| 236,849 A | 1/1881 | Searle |
| 311,021 A | 1/1885 | Mann |
| 2,582,842 A | 1/1952 | Messinger |
| 2,621,857 A | 12/1952 | Wixon |
| 2,726,042 A | 12/1955 | Baier et al. |
| 2,784,549 A | 3/1957 | Henney |
| 3,758,031 A | 9/1973 | Moran ......................... 237/8 A |
| 3,822,740 A | 7/1974 | Hackett ........................ 165/45 |
| 3,877,639 A | 4/1975 | Wilson et al. .......... 237/12.3 C |
| 4,300,720 A | 11/1981 | Baier et al. ............. 237/12.3 A |
| 4,381,075 A | 4/1983 | Cargill et al. .................. 237/8 |
| 4,417,688 A * | 11/1983 | Schnaibel et al. ......... 236/91 F |
| 4,832,259 A * | 5/1989 | Vandermeyden .......... 236/20 R |
| 5,025,985 A | 6/1991 | Enander ...................... 237/2 A |
| 5,067,652 A | 11/1991 | Enander ...................... 237/81 |
| 5,195,886 A | 3/1993 | Ida ............................... 431/30 |
| 5,391,075 A | 2/1995 | Robinson et al. ........... 431/258 |
| 5,470,019 A | 11/1995 | Martensson ................. 237/19 |
| 5,527,180 A | 6/1996 | Robinson et al. ........... 431/258 |
| 5,678,760 A | 10/1997 | Muso et al. ................... 237/2 |
| 5,687,908 A | 11/1997 | Talbert et al. ................ 237/19 |
| 5,692,676 A * | 12/1997 | Walker ....................... 237/8 R |
| 5,759,024 A | 6/1998 | Robinson .................... 431/247 |
| 5,775,582 A * | 7/1998 | Hammer ..................... 237/8 A |
| 5,927,961 A | 7/1999 | Robinson et al. ........... 431/207 |
| 6,085,738 A | 7/2000 | Robinson et al. ............. 126/75 |
| 6,109,912 A | 8/2000 | Robinson et al. ........... 431/247 |
| 6,212,894 B1 | 4/2001 | Brown et al. ................. 62/180 |
| 6,289,852 B1 | 9/2001 | Murgu et al. ............. 122/448.1 |

OTHER PUBLICATIONS

Hurricane Heating System Operator's Manual for Diesel Hot Water Heating Systems, International Thermal Research Ltd., copyright 1995, 1996, 1997, 1998, 1999, 2000, 2001.

(List continued on next page.)

*Primary Examiner*—Derek Boles
(74) *Attorney, Agent, or Firm*—Sheridan Ross P.C.

(57) ABSTRACT

A compact vehicle heating system and method is provided which includes mechanisms to selectively shut down heating systems. For example, when domestic hot water is required, space heating and engine preheating systems can be shut down in order to provide priority heating to the domestic hot water. When the demand for domestic hot water is lower, the space heating and engine preheat systems can be reactivated.

5 Claims, 5 Drawing Sheets

OTHER PUBLICATIONS

Peter Koch, Franz Neumeyer, Peter Waas, and Michael Nothen, SAE Technical Paper Series, "Optimization of Water Heating Systems", No. 890050, pp. 395–403.
Webasto Thermosystems, "The Scholastic Series Bus Heater", 1998.
Webasto Thermosystems, "Air Top 200 Air Heater".
Webasto Thermosystems, "Thermo 90 Coolant Heater".
Webasto Thermosystems, "Webasto Air Top 5000 Air Heater".
Webasto Thermosystems, "Webasto Shuttle Bus Heaters".
Webasto Thermosystems, "Webasto DBW 2010 Coolant Heater".

\* cited by examiner

COMPACT VEHICLE HEATING APPARATUS AND METHOD

REFERENCE TO RELATED APPLICATIONS

This is a continuation application of U.S. patent application Ser. No. 10/027,473 filed on Dec. 21, 2001, now U.S. Pat. No. 6,572,026 which is a continuation application of U.S. patent application Ser. No. 09/454,157 filed Nov. 30, 1999, now U.S. Pat. No. 6,332,580 which claims priority from U.S. Provisional Patent Application No. 60/110,474 filed Nov. 30, 1998 and entitled "Compact Vehicle Heating Apparatus and Method", all of which are incorporated herein by reference in their entirety.

FIELD OF THE INVENTION

This invention relates to providing supplemental thermal energy to vehicles having living areas, and more particularly to providing supplemental heat to over-the-road and marine craft having rooms and domestic water to be heated.

BACKGROUND

Vehicles of many types have been used to provide temporary living or working quarters. These include self-propelled over-the-road vehicles, such as so-called recreational vehicles powered by internal combustion engines. Also, self-propelled vans have been used as mobile work spaces, such as for providing medical services at remote or movable locations in a city. Other self-propelled vehicles include boats in which internal combustion engines provide the primary power source. Other non-self-propelled vehicles, such as trailers, have been used to provide shelter for temporary living, such as for vacation or recreation. Also, trailers are used to provide space for performing work, such as at construction sites or performing atmospheric sensing at remote locations.

All of these vehicles are characterized by the need to provide heated space, in the form of at least one room. In general, many separate rooms or work areas are provided. Also, sanitary facilities are provided in such vehicles, and include plumbing fixtures such as sinks, showers, and toilets that use domestic water, especially heated water.

The term "vehicle" is used herein to refer to all types of vehicles, whether or not self-propelled and whether an over-the-road or water vehicle, so long as there is a space to be heated in the vehicle and/or a requirement that heated domestic water be available for use. The term "vehicle" may also include the above type of vehicle that is also provided with a main power source, such as an internal combustion engine, that has a primary function of propelling the vehicle on land or water. Customarily, those main power sources are heated when not in operation, so that they will start readily when the vehicle is to be moved.

The main power source of such vehicle is turned off when the vehicle arrives at the destination, and reliance is placed on a supplemental source of thermal energy. Such supplemental thermal energy sources include diesel-fired and gasoline-fired burners, such as those disclosed in U.S. Pat. Nos. 2,726,042 and 3,877,639.

An improved heating system for a recreational vehicle is described in U.S. Pat. Nos. 5,025,985 and 5,067,652, both of which are incorporated herein by reference in their entirety. However, improvements are desirable. For example, it would advantageous if the heating system were compact, so as not to take up more valuable space in a vehicle than is necessary. It would be advantageous if the heating system included an efficient control system. It would be advantageous if the heating system could provide space heating and hot water heating, as well as optional engine heating if desired.

SUMMARY OF THE INVENTION

In accordance with the present invention, a heating system is provided which includes a heating medium and a first heat transfer device located within said heating medium capable of heating a fluid flowing through the first heat transfer device. Operatively connected to the input side of the first heat transfer device is a first temperature sensor. This first temperature sensor is located outside of a tank which contains the heating medium. When the fluid to be heated, such as cold water to be heated for domestic hot water use, flows through the first heat transfer device, the first temperature sensor will register a relatively low temperature because the fluid flowing past it is cold. When the first heat transfer device is not in use, the first temperature sensor will register a higher temperature, due to conduction of heat from within the tank to the nearby location of the first temperature sensor. Preferably, a second temperature sensor is also provided which measures the temperature of the heating medium within the tank. Preferably the second temperature sensor is in direct fluid contact with the heating medium within the heating tank. The heating medium can also be pumped out of the tank in order to provide heat for desired purposes, such as space heating purposes. Alternatively, a separate heat transfer fluid can be employed which passes through a second heat transfer device within the tank to obtain heat from the heating medium and to circulate it for desired purposes, such as space heating purposes. A heat source, preferably a diesel fuel-burning heat source is provided to heat the heating medium. Preferably, a tank agitation device is also provided in order to provide efficient heat transfer to the heat transfer device or devices located within the tank.

Figure 4:
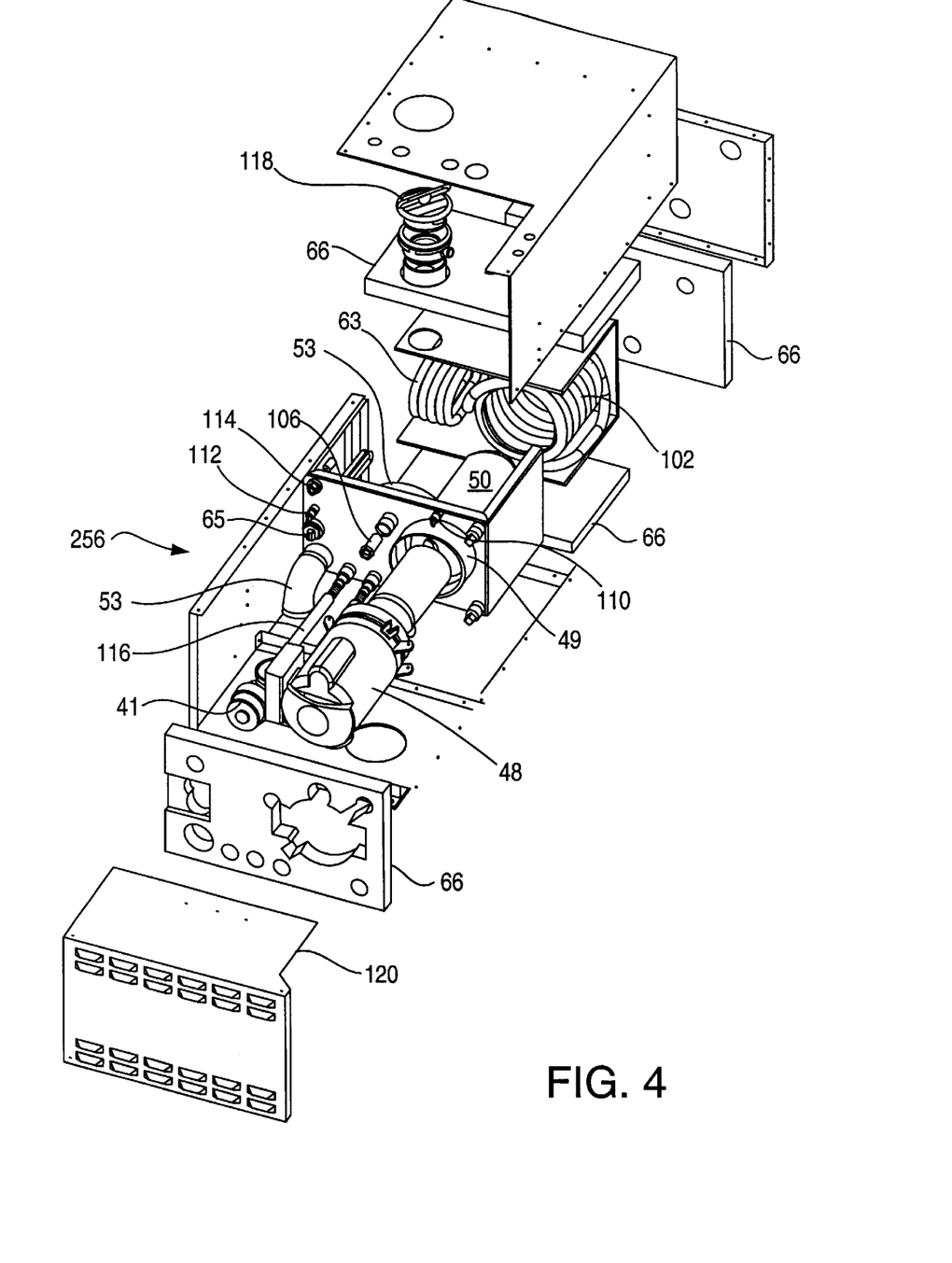
FIG. 4 is an exploded perspective view of an embodiment of a compact vehicle heating apparatus in accordance with the present invention.
Figure 5:
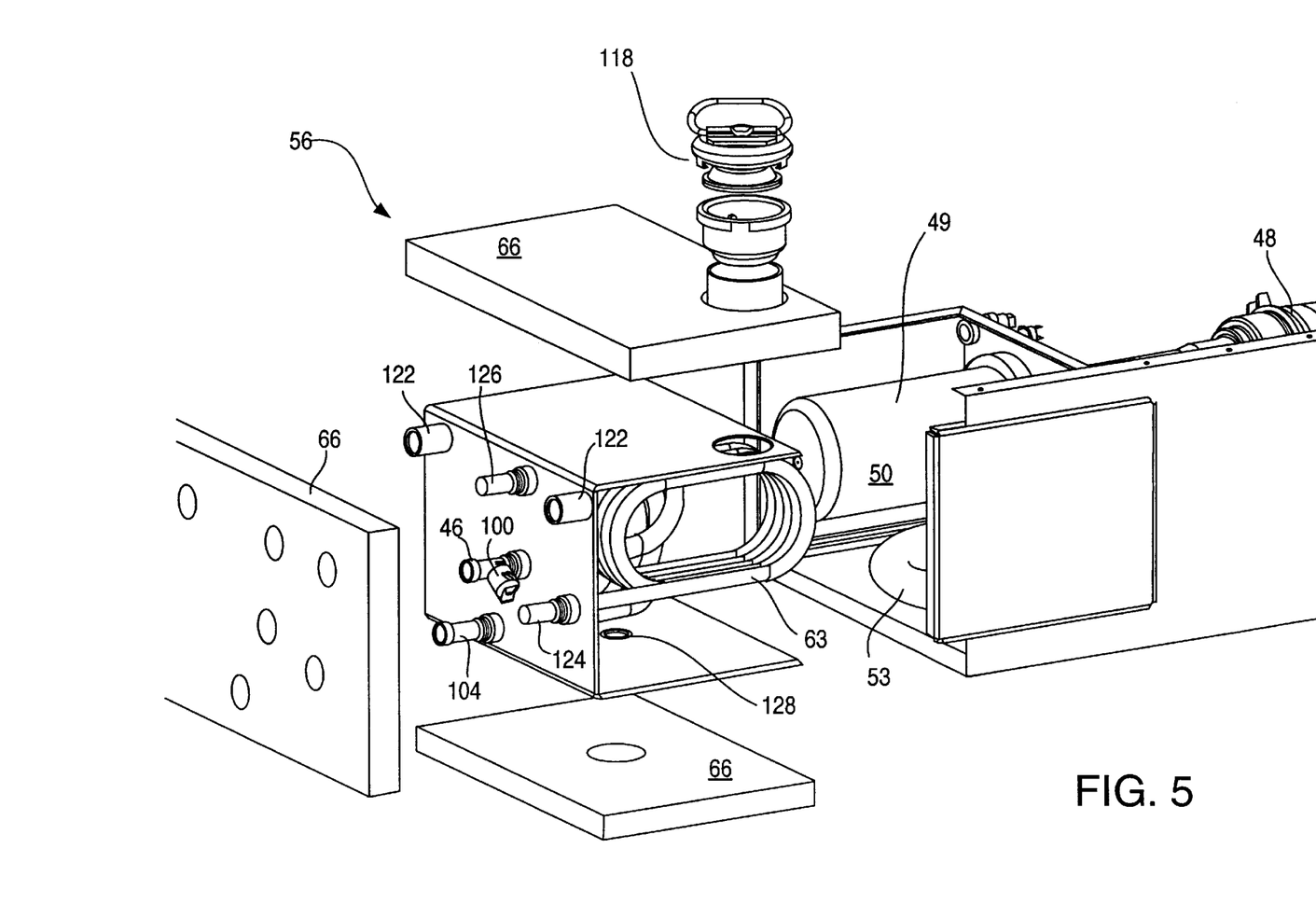
FIG. 5 is another exploded perspective view of the compact vehicle heating apparatus illustrated in FIG. 4.

Preferably the heat tank is more compact than those provided in prior art devices such as those disclosed in U.S. Pat. Nos. 5,025,985 and 5,067,652. Preferably the tank is a rectangular box or cube as opposed to a sphere or cylinder. In this way the tank can be more efficiently placed within a vehicle and uses the space more efficiently. Preferably the tank is about one third the size of prior art tanks. Preferably the heating system uses lower temperatures and pressures than those found in prior art tanks. Preferably, an optional heating loop is provided for engine preheating. This heating loop can use the heat transfer medium directly or use a separate heat transfer medium and a heat transfer device within the heating tank. In FIGS. 4 and 5, a heat transfer device is illustrated for heating water for domestic hot water use and the heat transfer medium is used directly for space heating. The optional engine heater is also illustrated.

Figure 1:
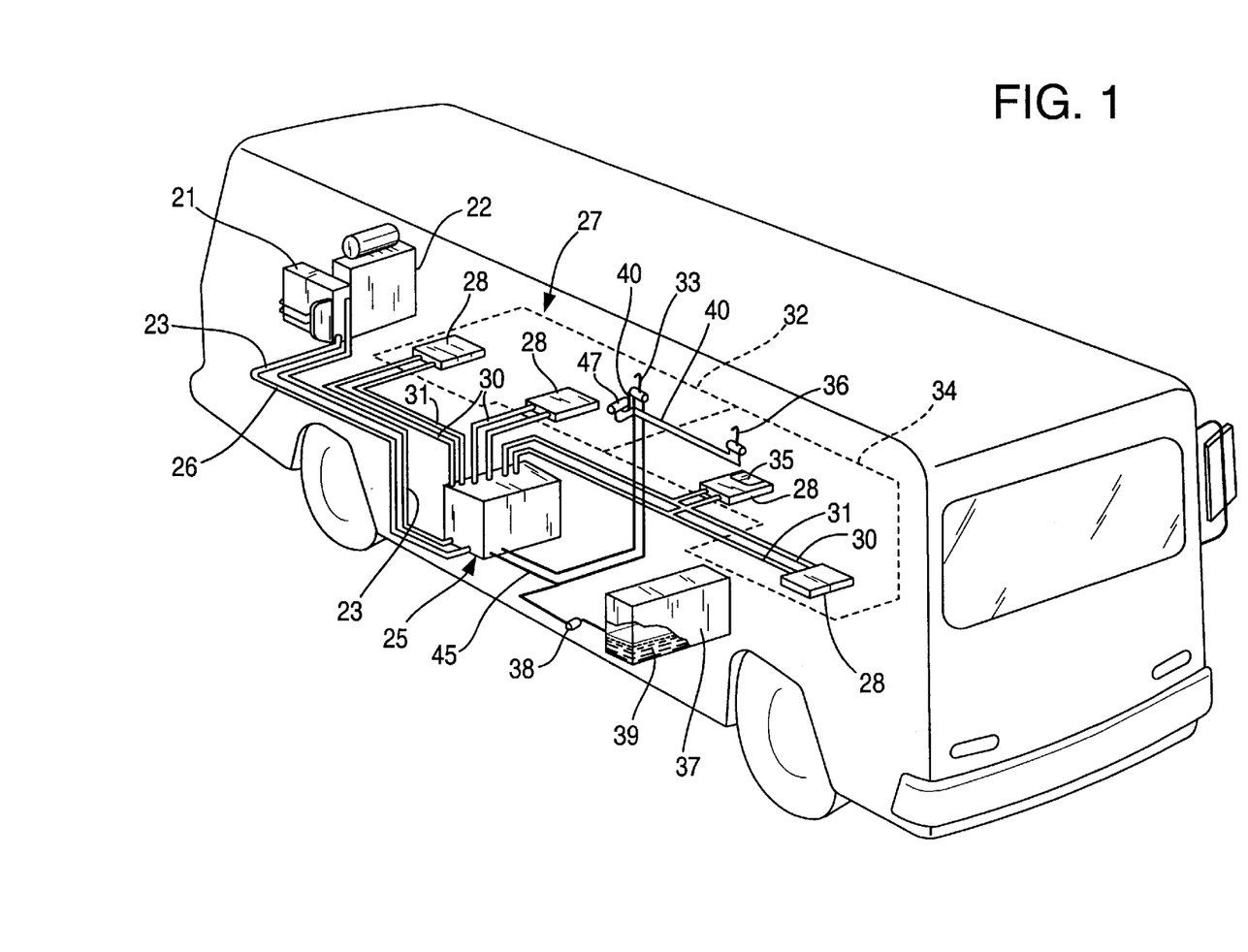
FIG. 1 is perspective view of a vehicle provided with a heating apparatus for providing supplemental thermal energy for room air, domestic hot water and main engine heating.
Figure 2:
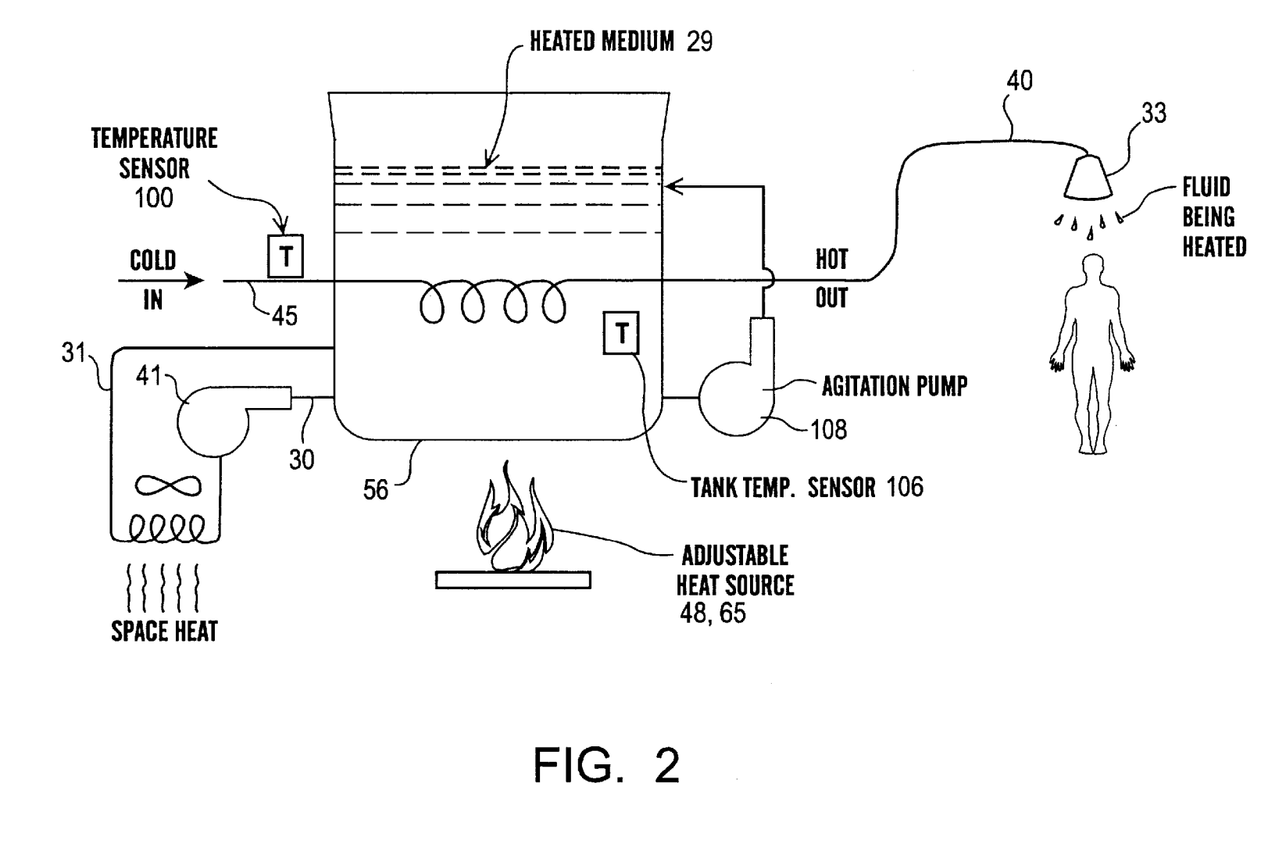
FIG. 2 is a schematic illustration of an embodiment of the heating system of the present invention.
Figure 3:
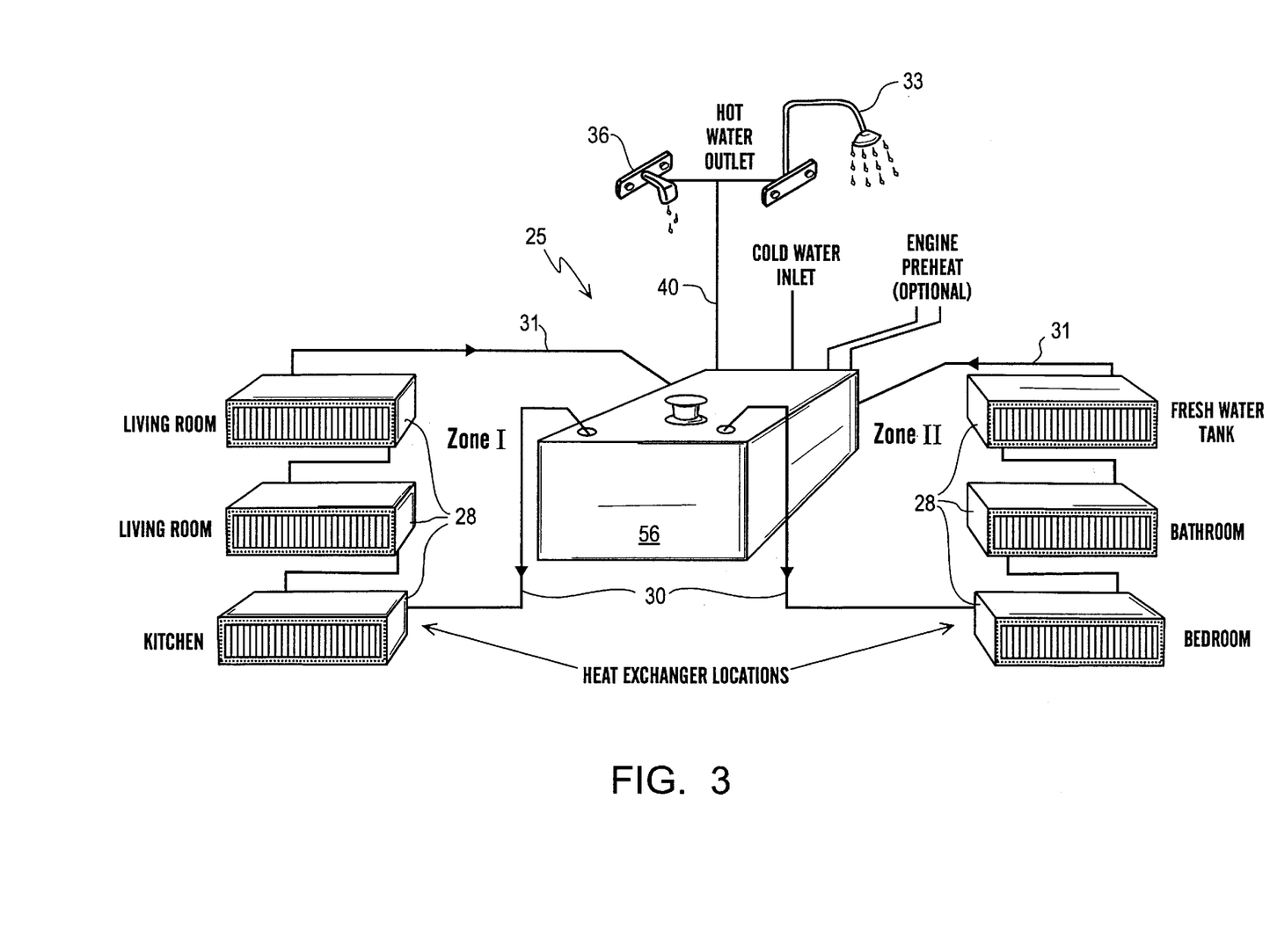
FIG. 3 is an illustration of an embodiment of the heating system of the present invention.

In accordance with the method of the present invention, a heating fluid is heated within a tank. A first heat transfer device is provided within the tank in order to heat a fluid such as water for domestic hot water use. A first temperature sensor is provided external to the tank, but near the tank on the inlet side of the first heat transfer device. A cool fluid such as cold water flows past this first temperature sensor into the heat transfer device located within the heating medium. Heat is transferred from the heating medium to the fluid flowing through the first heat transfer device which exits and can be employed, e.g., as domestic hot water within a recreational vehicle. The heating medium can also be circulated through the vehicle and in particular through heat transfer devices located within the vehicle, for space heating purposes, as illustrated in FIGS. 1, 2 and 3. It can also be employed for engine preheating. Alternatively, second and/or third heat transfer devices can be located within the heating medium to provide the heat to a circulating fluid which is employed for space heating purposes and/or engine preheating purposes. A second temperature sensor is provided to determine the temperature of the heating medium within the tank. Preferably this second temperature sensor is in fluid contact with the heating medium. Preferably a control system is provided, including temperature sensors which are preferably solid state, although mechanical controls and/or sensors can be used. The control system can be employed to selectively disable parts of the heating system.

DETAILED DESCRIPTION OF THE INVENTION

Referring to FIG. 1, there is shown a vehicle 20 that is designed to be propelled by a main engine 21. As described above, the vehicle 20 may also be in the form of a boat, in which event the main engine 21 propels the boat on the water. The vehicle 20 may also be a trailer that is towed by another self-propelled vehicle.

The main engine 21 may be an internal combustion engine or other type of engine having a liquid coolant system 22 for maintaining the main engine 21 at a desired operating temperature. Preferably, when the vehicle 20 is being propelled by the main engine 21, thermal energy is supplied via a conduit 23 that carriers heated engine coolant to an auxiliary thermal energy system 25. Cooled coolant is returned to the main engine 21 via a return conduit 26. When the main engine 21 is not operating, the main engine 21 can optionally be maintained at a desired temperature when not operating by supplying heated engine coolant from the auxiliary system 25 to the main engine 21 via the return conduit 26.

In the various forms of the vehicles, separate spaces or rooms 27 (illustrated by dashed lines in FIG. 1) can be provided for various living or working activities. In each room, at least one liquid-to-air heat exchanger 28 is provided for heating the room air to a desired temperature. These heat exchangers 28 may be of a standard type known as fan convectors. Heat transfer liquid is supplied to the heat exchangers 28 from the auxiliary system 25 by supply conduits 30 and is returned to the auxiliary system by return conduits 31.

As shown in FIG. 1, one of the rooms 27 may be a bathroom 32 that is provided with a shower head 33. Another room 27 may be a kitchen 34 provided with a sink 35 and faucet 36. The shower head 33 and the faucet 36 are connected to a standard domestic water tank 37. As shown, a pump 38 provides pressure to supply domestic water 39 from the tank 37. The domestic water 39 is heated by the auxiliary system 25 and is supplied via hot water conduits 40 to the respective shower head 33 and the faucet 36.

Referring to FIG. 2, the supply and return conduits 30 and 31, respectively, that are connected to the room air heat exchangers 28 are shown connected to zone pump 41. A conduit 30 supplies heated heat transfer fluid to the zone pump 41 from the auxiliary system 25. In a typical vehicle 20, a zone to be heated is defined by a room 27, and may typically have a thermal load of from 3,000 to 8,000 BTUs per hour. This load represents the thermal energy necessary to maintain the room air temperature in the room 27 at 75° F., for example, with an outside ambient temperature of from 0° to 50° F. In the aggregate, the thermal load of all of the rooms 27 of the vehicle 20 would typically be about 20,000 BTUs per hour.

Referring to FIG. 1, a cold water conduit 45 from the domestic water tank 37 is shown connected to the auxiliary system 25 to provide heated domestic water in the hot water conduit 40 that is connected to the shower head 33, a lavatory 47 and the kitchen faucet 36. A mixing valve can be used for blending hot domestic water and cold water to obtain a desired temperature of the hot domestic water exiting the system 25. The typical demand for hot domestic water 39 is about 1.5 gpm for the shower head 33, the kitchen faucet 36 and the lavatory 47 at a temperature of 105° F., for example. If the cold domestic water 39 is stored in the tank at 55° F., for example, then the thermal load of that domestic water would be about 40,000 BTU per hour.

During use, when hot water is desired, cold domestic water 39 flows through conduit 45 into the inlet 46 of the first heat transfer device 102 (FIGS. 4 and 5). The fluid, e.g. the cold domestic water 39, passes the first temperature sensor 100, passes through the first heat transfer device 102 and exits the auxiliary heater 25 at the hot domestic water outlet 104. This heated fluid can be used for any appropriate purpose. While the fluid, such as domestic water, is being heated in this matter, the first temperature sensor 100 will sense the cooler temperature of the cold inlet fluid. This low sensed temperature will cause the space heater circuit to be temporarily deactivated (e.g., zone pumps 41 will be turned off) so that all the heating is directed to the heating of this cold inlet fluid. This cold inlet fluid can draw down the temperature of the heating medium 29 quickly, because the first heat transfer device 102 located within the tank typically has a high heat transfer capacity and the tank 59 typically has a low volume. For example, the first heat transfer device 102 can be about 20 to about 40 linear feet of coiled copper. It will be appreciated that any appropriate heat transfer device (e.g., tubular, plates, etc.) can be employed.

In one embodiment of the present invention, the first temperature sensor is set at a relatively low temperature. For example, the first temperature sensor can be set at about 100° F. When the temperature reaches or falls below 100° F., the other heating circuits (e.g., space heating and/or engine heating) are deactivated. Any suitable temperature sensor can be used for the first temperature sensor 100. For example, a suitable temperature sensor is a mechanical snap disk manufactured by Elmwood Sensors. The mechanical snap disk is preset at a desired temperature, e.g., 100° F. When the temperature reaches or falls below the preset temperature, a disk pops out which electrically deactivates other heating circuits. For example, when the disk pops out, an electrical circuit can be broken thus turning off the zone pumps 41 and the engine preheat pump (not shown). Other suitable deactivation devices and techniques can also be employed. In this way, all the heat from the auxiliary heater 25 is directed to the desired primary heat system, e.g., domestic hot water. The second tank temperature sensor 106 is employed to start and stop the fuel-fired burner 48 and/or electric heater 65. For example, when the second tank heat sensor 106 detects a temperature below a certain set point (e.g., about 165° F.), the fuel-fired burner 48 and/or electric heater 65 are activated. The heaters 48 and/or 65 remain activated until a preset temperature is reached, e.g., about 180° F.

Alternatively, as cold fluid is heated by the heating medium 29, the second temperature sensor 106 can be designed to register a decreasing heating medium 29 temperature. Because heat is being removed from the heating medium 29 in a rapid fashion, the control system can be designed to start the heating cycle, using the heat source 48 and/or 65, quicker than normal. For example, when the combination of the first temperature sensor 100 is registering a cool temperature because cold water is flowing by it and the second tank temperature sensor 106 is registering a dropping value for the temperature of the heating medium 29 within the tank, the heat source 48 can be programmed to come on at a higher temperature, e.g., 175° F. instead of 165° F., because the control system is programmed to recognize that heat is being withdrawn from the heating medium in a rapid fashion. The second temperature sensor 106 can be designed to provide information on the rate of temperature decrease in order to fine tune when the heat source 48 and/or 65 should come on.

When cold water is not flowing into the first heat transfer device 102, the first temperature sensor 100 will register a higher temperature. This is because the heating medium 29 will transfer heat to the tubing and fluid of the first heat transfer device 102 which will be conducted backwards through the inlet 46 to the first temperature sensor 100. When this sensor 100 registers a temperature above a predetermined temperature, the space heater and/or engine preheater will be allowed to operate. Additionally, the heat source does not have to come on until the second tank temperature sensor reaches a lower predetermined temperature, because the space heater and/or engine preheater typically do not remove heat from the heating medium 29 as rapidly as does the first heat transfer device 102. In this way, the control system can accurately and dependably control the heating of the heating medium 102 using a desirable long heating cycle and using more infrequent heating cycles, thus reducing maintenance and conserving energy. Preferably the method of the present invention includes an agitation step wherein the heating medium is moved from one portion of the tank to another portion in order to improve the efficiency of the heat transfer. For example, as illustrated in FIG. 2, an agitation pump 108 can circulate the heated medium 29 from near the bottom of tank 56 to near the top of tank 56. For low heating loads, an agitation pump may not be needed.

To supply the thermal load of room air heat exchangers 28 and the domestic hot water 39, a vehicle 20 such as a "recreational vehicle," for example, is provided with the auxiliary system 25 having a peak thermal output of about 45,000 BTU per hour. The auxiliary system 25 may include a propane, gasoline or diesel-fired burner 48 (FIGS. 4 and 5). In a preferred embodiment, the burner 48 is a Model DBW 2010 burner manufactured by Webasto AG having a thermal output of 45,000 BTU/hr. Such a burner 48 is normally shipped with a combustion chamber 49 (FIGS. 4 and 5) in the form of a closed horizontal cylinder 50 having an air/fuel inlet at one end and an exhaust pipe 53 at the other end. The combustion chamber 49 of the burner 48 is typically about twelve inches long and has an outer diameter of about six inches.

FIGS. 4 and 5 illustrate preferred embodiments of the thermal reservoir 56 of the auxiliary heating system 25 of the present invention. In particular, FIGS. 4 and 5 are exploded perspective views of the thermal reservoir 56 shown from opposite ends. In FIG. 4, a burner 48 is shown. Preferably, this burner is diesel-fuel fired, although other fuels (e.g., kerosene, gasoline, propane, etc.) can be employed. The burner 48 includes a combustion chamber 49 which is defined by a cylindrical cover 50. A second, optional, heat source can be provided, such as an electric heater 65. The operation of the burner 48 and electric heater 65 can be controlled by a thermostat 106. This thermostat or second tank heat sensor 106 is designed to turn on the burner 48 and/or electric heater 65 when the temperature of the heating medium 29 falls below a desired value (e.g., 165° F.) and to shut off the burner 48 and electric heater 65 when the temperature of the heating medium 29 rises above a desired temperature (e.g., 180° F.). An over-temperature sensor 110 is provided for the burner 48 and an over-temperature sensor 112 is provided for the electric heater 65. These two sensors will shut down the burner 48 and electric heater 65, respectively, if an over-temperature is reached (e.g., 230° F.). This provides a back-up safety feature to prevent overheating. A low-water cutoff switch 114 is provided to shut down operation of the unit in the event that the heating medium 29 falls below a minimum level. This is yet another safety feature.

The combustion products from the burner 48 can be exhausted through exhaust pipe 53. Preferably, a portion of the exhaust pipe 53 passes through the heating medium 29 in order to extract waste heat from the exhaust.

One zone pump 41 is shown, along with the corresponding pump supply conduit 116. Typically, there would be a pump supply conduit 116 and zone pump 41 for each heating zone desired. The pump 41 draws heating medium 29 directly out of the thermal reservoir 56 for circulation through the vehicle 20 for space heating purposes. An engine heat transfer coil 63 is provided to preheat an engine in one mode of operation and to provide a source of heat to the heating medium 29 when the engine is operating in the reverse mode of operation. A domestic hot water heat exchanger 102 is provided for heating domestic water. The reservoir 56 is surrounded by various insulation panels 66 and covers (e.g., access cover 120). When assembled, a fluid-tight tank is provided for the heating medium 29.

FIG. 5 illustrates the perspective exploded view of the apparatus of FIG. 4 from the opposite end. A cold water inlet 46 is provided which will connect to domestic water conduit 45. As cold water flows through the inlet 46 and past the first heat sensor 100, the temperature of the heat sensor will fall below a preset point (e.g., 100° F.). When the temperature falls below the preset point, the other heating systems (e.g., space heating and engine preheating) are deactivated. As a result, the thermal energy in the heating medium 29 is concentrated on the domestic hot water. Although the first heat sensor 100 can be used to shut down all other heating systems, it can also be used more selectively. For example, the sensor 100, in combination with the second tank heat sensor 106, can be used to selectively shut down other heating systems in a desired priority. For example, the engine preheat system could be shut down first, and space heating zones could be shut down one at a time until the proper balance between continuous domestic hot water heat requirement and other heat requirements are reached. In this way, some of the space heating zones can be operated simultaneously with the domestic hot water heat system. As will be appreciated by one skilled in the art, the present invention can be employed when heating systems other than engine preheat, space heating zones and domestic hot water heat are employed.

As the water flows from the inlet 46 through the domestic hot water coil 102 and out the hot water outlet 104, it is heated. Preferably, the domestic hot water coil 102 is a double wall coil. This is a safety feature, in view of the fact that the heating medium 29 preferably contains an antifreeze (e.g., ethylene glycol) and it is desirable to keep the domestic water from being contaminated by any antifreeze. A double wall coil 102 reduces the chances of contamination.

FIG. 5 also illustrates the space heat return ports 122. Typically there is a return port 122 for each zone. The return ports are connected to the return space heat conduits 31. The engine heat transfer coil 63 is operatively connected to inlet port 124 and outlet port 126. Engine coil inlet port 124 is connected to conduit 23 (FIG. 1) and outlet port 126 is connected to conduit 26 (FIG. 1). A tank fill and pressure cap 118 is provided for introducing heating medium 29 into the tank and a tank drain 128 is provided for draining fluid from the tank.

The thermal reservoir 56 of the present invention is connected to the auxiliary system 25 in three ways. First, the conduits 30 are connected to the zone pumps 41 or zone valves. The pump supply conduits 116 supply the heated liquid 29 to each of the zone pumps 41 or zone valves. A selected one or more of the pumps 41 or zone valves is operated to supply the heated liquid 29 to the heat exchanger 28 in the zone or room 27, such as the kitchen 34 to which the supply conduit 30 is connected. The liquid 29 exits the heat exchanger 28 and returns via the return conduit 31 to space heat return ports.

Second, the domestic water 39 is supplied from the domestic water tank 37 by the pump 38. The cold water conduit or pipe 45 is connected to the pump 38 and supplied cold domestic water 39 (e.g., at 55° F.) to an inlet 46 (FIG. 5) of a coil 102 located in the thermal reservoir 56. The coil 102 is secured, such by brazing, in a serpentine path or in a circular path (FIGS. 4 and 5) within the thermal reservoir 56 so that the domestic water 39 in the coil 102 is in heat transfer relationship with the liquid 29 in the thermal reservoir 56. The pump 38 causes the domestic water 39 to flow through the coil 102 to the hot water line or conduit 40 that supplies the domestic hot water to the kitchen faucet 36, the shower head 33, the lavatory 47, etc.

Third, the respective vehicle engine supply and return conduits 23 and 26 are connected to a respective coil 63 (FIGS. 4 and 5) and an engine coolant pump (not shown). The pump causes the engine coolant to flow through the heat exchange coil 63 that extends through the liquid 29 in the thermal reservoir 56 and to the return conduit 26 to the main engine 21. If the main engine 21 is to be heated, the liquid 29 is in a desired range, e.g., from 150° F. to 180° F. If the liquid 29 in the thermal reservoir 56 is to be heated during operation of the main engine 21, the coolant 24 is at a higher temperature than that of the liquid 29 in the thermal reservoir 56, such as 180° F.

The auxiliary system 25 of the present invention is also provided with an electric heater 65 (FIGS. 4 and 5) to maintain the liquid 29 in the thermal reservoir 56 in a ready condition at the upper or maximum operating temperature, e.g., 180° F. Preferably, the electric heater 65 has a rated capacity of 1650 Watts at 120 volts AC. A standard AC generator or power supply (not shown) is provided for supplying power to the heater 65.

Referring to FIG. 4, the reservoir 56 is shown provided with second tank heat sensor or thermostat 106. The thermostat 106 extends into the heat transfer liquid 29 in the reservoir 56 for response to the temperature of the liquid 29. The thermostat 106 may be an analog or digital thermostat which responds to the temperature of the liquid 29 by operating a circuit. The circuit is connected to the burner 48 and electric heater 65. When the circuit is open, the burner 48 and electric heater 65 shut off. In the example described above, the temperature at which the thermostat 106 opens the respective circuits is 180° F.

The thermostat 106 can also be set to close the respective circuits in response to the liquid 29 having the lower limit temperature. In the example described above, where the lower temperature is 165° F., the thermostat 106 for the burner 48 and electric heater 65 closes the circuit in response to a temperature of 165° F. of the liquid 29. In this manner, when the temperature of the liquid 29 drops to 165° F., then the burner 48 and electric heater 65 are turned on and the temperature of the liquid 29 is increased to 180° F. during the operational cycle. The automatic, thermostat controlled operation of the burner 48 and electric heater can be manually overridden. For example, if an operator desired to rely solely on the burner 48, the electric heater 65 could be manually turned off. As a result, only the burner 48 would cycle on and off in response to the thermostat. Likewise, the burner 48 can be manually turned off and all heat supplied by the electrical heater during low demand periods.

Many advantages of the present invention can result from locating a first temperature sensor on the cold water supply line into the boiler/water heater. This sensor is very close to the boiler wall so it will be hot any time water is not flowing through the pipe, cooling it. When water is being used, the first sensor is cold. When water is not being used, the first sensor is hot. The signal from this sensor can be either analog or digital.

Heating systems can benefit from the use of a first heat sensor by providing hot water as the first priority and space heating as the second priority. In one embodiment of the invention, the heater is smaller, less expensive and provides quality thermal comfort compared to prior designs. The signal from the first temperature sensor is used to disable space heat when the sensor detects water flow for hot water use. This is desirable because hot water requires lots of heat immediately and is used for relatively short periods. Space heating can be turned off for short periods and normally the space will remain comfortable. The heating system can be smaller since it can separately provide heat for space heating or domestic hot water, but does not have to provide heat for both at the same time.

In another embodiment of the present invention, heating system performance can be improved by agitating the fluid to enhance heat transfer. The signal from the first temperature sensor can additionally be used to turn on a source of heat exchanger agitation. Hot water requires a lot of heat immediately and agitating the fluid in the heat exchanger provides it with a smaller size exchanger. In the present invention, this agitation is preferably provided by a pump that pumps fluid from the bottom of the tank to the top, thereby causing the hot fluid to circulate rapidly around the piping (heat exchanger) carrying the fluid that is being heated.

Heaters that turn heat sources on and off or increase or decrease the heat supply often react slowly, causing over- or under-heating. A signal from the first temperature sensor combined with the tank temperature signal will provide more information than a tank temperature sensor alone. This information will enable a controller to anticipate an over- or under-heating condition and effect the adjustment of the heat source sooner, without causing a short heating cycle. When the information from this sensor is combined with similar temperature signals from the boiler tank sensor, a characteristic pattern can be identified by a smart controller before the over- or under-heating condition happens.

The signals from the first temperature sensor and the tank temperature sensor can provide information to allow reduction of over- or under-heating without decreasing the length of the burn cycle. Fuel-burning heaters often require some minimum cycle time in order to ignite, burn and extinguish safely. This is called one burn cycle. The post burn period must be long enough to clear any residual combustibles from the burn chamber before it tries to re-ignite. This is to prevent a back-fire at initial ignition. The burn time must be long enough for the burn chamber to get hot enough to clear itself of any unburned material such as fuel, smoke or soot often caused during startup. Of course, heat is not delivered until the fire is ignited and has burned long enough to heat its immediate surroundings. This is why the burn cycle must be started earlier than non-combustion heat sources and must run for a minimum length of time without overheating before it is allowed to turn off. The present combination of sensors, sensor locations and controls can achieve the desired results.

The heating system of the present invention combines a continuous supply of domestic hot water as well as interior heating into one space-savings device, and can provide one or more of the following advantages. Domestic water is heated on demand as it is being used, thus there is no need for a separate water heater. Low-velocity heat exchangers can provide quiet interior heating. Temperatures can be controlled in separate (e.g., 5) heating areas independently. Domestic hot water and interior heating can be combined in one compact unit. The compact size frees up storage space. The heater can provide uniform, draft-free heating; no hot and cold air pockets. The heater provides safety features such as automatic shut-down in case of low voltage or overheat, and it can burn low-volatility diesel fuel. The AC powered electric heating element can provide heating and domestic hot water during low demand periods. The burner can use the vehicle's on-board diesel fuel, thus there is no need for propane to supply heat. The unit can provide low diesel fuel usage and low electrical DC power consumption.

In a preferred embodiment, the vehicle heating apparatus of the present invention has the following technical specifications:

| | |
|---|---|
| Diesel-burner voltage/power consumption | 12 volts, 60 watts |
| Diesel-burner heat output | 45,000 BTU/hr. |
| Fuel type | Diesel #1, #2, or Kerosene |
| Diesel-burner fuel consumption | 0.35 gal/hr |
| Electric heating element | 120 volt/AC, 1650 watts |
| Circulating pumps | (2) 12 volt DC, 21 watts |
| Number of heating zones | maximum of 5, plus engine heat loop |
| Domestic water heating capacity | Continuous/On-Demand |
| Dimensions | 12" H x 18.5" W x 30" L |
| Weight | approximately 105 lb. |

While the preferred embodiments have been described in order to illustrate the fundamental aspects of the present invention, it should be understood that numerous variations and modifications maybe made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims and as limited by the prior art.

What is claimed is:

1. A motor home, trailer or boat heating system, comprising:
    a) a heating medium;
    b) a heat source capable of being cycled for heating said heating medium;
    c) first heat transfer means for transferring heat from said heating medium to a domestic water line;
    d) second heat transfer means for transferring heat from said heating medium to a confined space;
    e) a first temperature sensor for sensing a temperature of said domestic water line, said first temperature sensor located external to, but near an inlet to said first heat transfer means; and
    f) control means operatively connected to said first temperature sensor to control said second heat transfer means and the cycling of said heat source.

2. The system as claimed in claim 1, wherein said heating medium comprises antifreeze.

3. The system as claimed in claim 1, further comprising a second temperature sensor for use in determining a temperature of said heating medium.

4. The system as claimed in claim 3, wherein said control means activates said heat source when said first temperature sensor detects a first temperature below a predetermined temperature and said second temperature sensor detects a rate of decrease in the temperature of said heating medium which exceeds a predetermined rate.

5. The system as claimed in claim 1, wherein said control means deactivates said second heat transfer means when said first temperature sensor registers a temperature below a certain predetermined temperature.

* * * * *